(12) United States Patent
Grigoryan et al.

(10) Patent No.: US 10,437,570 B2
(45) Date of Patent: Oct. 8, 2019

(54) SYSTEMS, METHOD, AND NON-TRANSITORY COMPUTER-READABLE STORAGE MEDIA FOR GENERATING CODE FOR DISPLAYING A WEBPAGE

(71) Applicant: Wal-Mart Stores, Inc., Bentonville, AR (US)

(72) Inventors: Alexander Grigoryan, San Jose, CA (US); Xiuhao Joel Chen, San Ramon, CA (US); Arpan Y. Nanavati, Castro Valley, CA (US); Caoyang Shi, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 129 days.

(21) Appl. No.: 15/415,653

(22) Filed: Jan. 25, 2017

(65) Prior Publication Data
US 2018/0210714 A1  Jul. 26, 2018

(51) Int. Cl.
  *G06F 9/44* (2018.01)
  *G06F 8/38* (2018.01)
  *G06F 8/36* (2018.01)
  *H04L 29/08* (2006.01)
  *G06F 8/41* (2018.01)
  *G06F 8/30* (2018.01)
  *H04L 29/06* (2006.01)
  *G06F 17/22* (2006.01)

(52) U.S. Cl.
  CPC ............. *G06F 8/38* (2013.01); *G06F 8/31* (2013.01); *G06F 8/36* (2013.01); *G06F 8/41* (2013.01); *G06F 17/2258* (2013.01); *G06F 17/2264* (2013.01); *H04L 67/02* (2013.01); *H04L 67/42* (2013.01)

(58) Field of Classification Search
  CPC .. G06F 9/44578; G06F 17/20; G06F 17/3089; G06F 21/10; G06F 3/0481; G06F 16/583; G06F 17/2258; G06F 17/2264; G06F 8/36; G06F 8/38; H04L 67/02
  See application file for complete search history.

(56) References Cited
U.S. PATENT DOCUMENTS 6,654,784 B1  11/2003  Wei
7,921,353 B1   4/2011  Murray
(Continued)

*Primary Examiner* — Tuan A Vu
(74) *Attorney, Agent, or Firm* — Bryan Cave Leighton Paisner LLP

(57) ABSTRACT

A system for use in displaying a webpage is described herein. The system includes a server computer that is configure to receive a request to display the webpage on a client computing device and execute a render-to-string operation upon receiving the request. The server computer accesses a database and retrieves the software components associated with the webpage. The server computer identifies client software components associated with the webpage and generates component code including instructions for rendering the client software components on the client computing device. The server computer identifies server software components associated with the webpage and generates rendered code associated with each server software component for use in displaying images associated with the webpage. The server computer transmits signals including the rendered code and the component code to the client computing device.

20 Claims, 9 Drawing Sheets

(56) References Cited

U.S. PATENT DOCUMENTS

| | | | |
|---|---|---|---|
| 8,245,125 B1 | 8/2012 | Pupius et al. | |
| 8,719,451 B1 | 5/2014 | Colton et al. | |
| 8,914,774 B1 * | 12/2014 | Colton | G06F 9/44578 709/203 |
| 8,954,989 B1 * | 2/2015 | Colton | H04L 67/02 709/203 |
| 8,994,967 B1 | 3/2015 | Mayers et al. | |
| 9,122,650 B1 * | 9/2015 | Colton | G06F 17/20 |
| 9,223,599 B1 | 12/2015 | Racanelli et al. | |
| 9,602,574 B1 | 3/2017 | Mocanu et al. | |
| 9,870,428 B2 | 1/2018 | Jellick et al. | |
| 9,900,369 B2 | 2/2018 | Afzal | |
| 2002/0033844 A1 * | 3/2002 | Levy | G06F 21/10 715/744 |
| 2006/0048135 A1 | 3/2006 | Hodson et al. | |
| 2006/0248166 A1 | 11/2006 | Milosevic et al. | |
| 2008/0184199 A1 | 7/2008 | Fried et al. | |
| 2009/0287657 A1 | 11/2009 | Bennett | |
| 2010/0269046 A1 | 10/2010 | Pahlavan et al. | |
| 2012/0010995 A1 * | 1/2012 | Skirpa | G06F 3/0481 705/14.49 |
| 2014/0181788 A1 | 6/2014 | Sullivan et al. | |
| 2014/0281918 A1 | 9/2014 | Wei et al. | |
| 2014/0289360 A1 | 9/2014 | Mahkovec et al. | |
| 2014/0297711 A1 | 10/2014 | He | |
| 2014/0303934 A1 | 10/2014 | Mylarappa et al. | |
| 2014/0325337 A1 | 10/2014 | McWeeney | |
| 2014/0344664 A1 | 11/2014 | Bleakley et al. | |
| 2014/0344666 A1 | 11/2014 | Bleakley et al. | |
| 2015/0046789 A1 | 2/2015 | Wei et al. | |
| 2015/0088968 A1 | 3/2015 | Wei et al. | |
| 2015/0120804 A1 | 4/2015 | Eschbach | |
| 2015/0206333 A1 * | 7/2015 | Crockett | G06F 16/583 715/202 |
| 2016/0012111 A1 | 1/2016 | Pattabhiraman et al. | |
| 2016/0012144 A1 | 1/2016 | Benjamin | |
| 2016/0012145 A1 | 1/2016 | Benjamin | |
| 2016/0344832 A1 | 11/2016 | Kukreja et al. | |
| 2017/0169001 A1 | 6/2017 | D'Aurelio et al. | |
| 2017/0192799 A1 | 7/2017 | Wherry et al. | |
| 2017/0220306 A1 | 8/2017 | Price et al. | |
| 2017/0310791 A1 | 10/2017 | Palse et al. | |
| 2017/0364485 A1 | 12/2017 | Kidambi et al. | |
| 2018/0034721 A1 | 2/2018 | Dunn et al. | |
| 2018/0088744 A1 | 3/2018 | Lin et al. | |
| 2018/0121401 A1 | 5/2018 | Wei et al. | |

* cited by examiner

```
import { AboveTheFoldOnlyServerRender } from "above-the-fold-only-server-render";

const SomeComponent = () => {
  return (
    <AboveTheFoldOnlyServerRender skip={true}>
      <div>This will not be server side rendered.</div>
    </AboveTheFoldOnlyServerRender>
  );
};
```
← 40

FIG. 7

```
import { AboveTheFoldOnlyServerRender } from "above-the-fold-only-server-render";

const SomeComponent = () => {
    return (
      <AboveTheFoldOnlyServerRender contextKey="aboveTheFoldOnlyServerRender.SomeComponent">
        <div>This will not be server side rendered based on the context.</div>
      </AboveTheFoldOnlyServerRender>
    );
};

class SomeApp extends React.Component {
  getChildContext() {
    return {
      aboveTheFoldOnlyServerRender: {
        SomeComponent: true
      }
    };
  } render() {
    return (
      <SomeComponent />
    );
  }
}

SomeApp.childContextTypes = {
  aboveTheFoldOnlyServerRender: React.PropTypes.shape({
    AnotherComponent: React.PropTypes.bool
  })
};
```
← 42

FIG. 8

```
// Choose `renderToString` or `renderToStaticMarkup` based on your use case.

import { renderToString, renderToStaticMarkup } from "@walmart/above-the-fold-render/enable";

const options = {
  // Skip rendering `BarComponent` wherever it is directly rendered by a
  // `FooComponent`.
  selectors: ['FooComponent > BarComponent']
};

console.log(renderToString(<FooComponent/>, options));
```

FIG. 10A

```
// module A, before `react` is imported:
import "@walmart/above-the-fold-render/enable";

// module B, where `renderToString` happens:
import { renderToString } from "@walmart/above-the-fold-render";
```

FIG. 10B

```
import { renderToString } from "@walmart/above-the-fold-render";
import Config from "@walmart/electrode-ui-config";

renderToString(<Foo/>, Config.ui.AboveTheFoldRender);
```

FIG. 10C

SYSTEMS, METHOD, AND NON-TRANSITORY COMPUTER-READABLE STORAGE MEDIA FOR GENERATING CODE FOR DISPLAYING A WEBPAGE

FIELD OF THE DISCLOSURE

The present invention relates to software components, and more particularly, to systems, methods, and computer-readable storage media for use in displaying a webpage.

BACKGROUND

Many consumers desire to order items or goods remotely, e.g., on-line, through the Internet, or using a specially designed application or app on a personal computer or mobile device, such as a tablet or cell phone. At least some known website hosting systems include search engines that allow consumers to enter search criteria and generate search results based on the consumer's search criteria. Known search engines may generate and display product lists to consumers via a website including products that are selected based on the search criteria.

At least some known websites receive a significant number of monthly visitors with page loads up to 10,000 requests per second. In addition, at least some e-commerce websites add more than one million new items each month, which requires the development of new webpages and website capabilities to support user access to the additional items.

Developing new webpages and functionality to support the additional products and to utilize emerging user technologies presents significant challenges to organizations responsible for developing new websites and website functionality. Accordingly, it is desired to provide an improved computer server system that supports the development of software applications that are consistent, reliable, and follow the most scalable development practices, as well as support consistent webpage builds and deployments across projects.

The present invention is aimed at one or more of the problems identified above.

SUMMARY OF THE INVENTION

In different embodiments of the present invention, systems, methods, and computer-readable storage media implement a server computer system for displaying a webpage on a client computing device.

In one embodiment of the present invention, one or more non-transitory computer-readable storage media, having computer-executable instructions embodied thereon are provided. When executed by at least one processor, the computer-executable instructions cause the processor to receive a request to display a webpage on a client computing device and execute a render-to-string operation to generate code associated with the webpage. The processor accesses a database and retrieves a plurality of software components associated with the webpage. Each software component includes computer-executable instruction code for generating rendered code for use in displaying the webpage on the client computing device. The plurality of software components includes server software components to be rendered by the server computer and client software components to be rendered by the client computing device. The processor identifies the client software components associated with the webpage and generates component code including instructions for rendering the client software components on the client computing device. The processor also identifies the server software components associated with the webpage and generates rendered code associated with each server software component for use in displaying images associated with the webpage. The processor transmits signals including the rendered code and the component code to the client computing device.

In another embodiment of the present invention, a computer-implemented method for operating a server computer system for use in displaying a webpage on a client computing device is provided. The method includes the server computer performing the steps of receiving a request from the client computing device to display a webpage on the client computing device and executing a render-to-string operation upon receiving the request. The server computer accesses a database and retrieves a plurality of software components associated with the webpage. Each software component includes computer-executable instruction code for generating rendered code for use in displaying the webpage on the client computing device. The plurality of software components includes server software components to be rendered by the server computer and client software components to be rendered by the client computing device. The server computer identifies the client software components associated with the webpage and generates component code including instructions for rendering the client software components on the client computing device. The server computer identifies the server software components associated with the webpage and generates rendered code associated with each server software component for use in displaying images associated with the webpage. The server computer transmits signals including the rendered code and the component code to the client computing device.

In yet another embodiment of the present invention, a system for use in displaying a webpage is provided. The system includes a server computer, a client computing device coupled in communication with the server computer, and a database. The client computing device includes a display device, a memory device, and a processor coupled to the memory device. The memory device includes a web-browser program being stored therein. The processor of the client computing device is configured to execute the web-browser program to display a webpage on the display device. The database includes a plurality of software components associated with the webpage. Each software component includes computer-executable instruction code for generating rendered code for use in displaying the webpage on the client computing device. The plurality of software components includes server software components to be rendered by the server computer and client software components to be rendered by the client computing device. The server computer is configure to receive a request to display the webpage on the client computing device and execute a render-to-string operation upon receiving the request. The server computer accesses the database and retrieves the software components associated with the webpage. The server computer identifies the client software components associated with the webpage and generates component code including instructions for rendering the client software components on the client computing device. The server computer identifies the server software components associated with the webpage and generates rendered code associated with each server software component for use in displaying images associated with the webpage. The server computer transmits signals including the rendered code and the component code to the client computing device.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 6-8 are illustrations of exemplary computer code generated by the system shown in FIGS. 1-2, according to embodiments of the present invention;

FIGS. 10A-10C are illustrations of exemplary computer code generated by the system shown in FIGS. 1-2, according to embodiments of the present invention;

Figure 1:
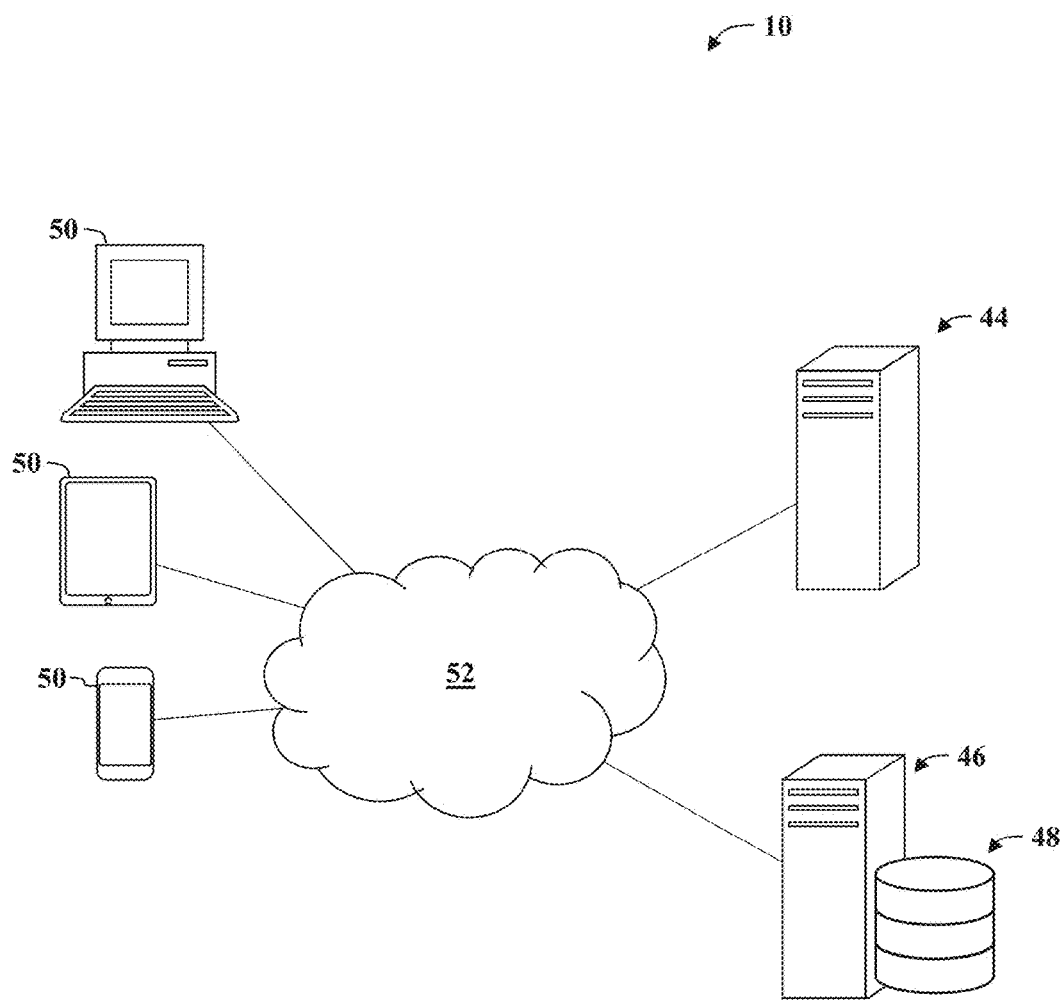
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the system 10 is configured to execute a software program, Electrode™, that is a platform for building universal React/Node.js applications with a standardized structure that follows best practices and has modern technologies baked in. The software program Electrode™ focuses on performance, component reusability and simple deployment to multiple cloud providers—so you can focus on what makes your app unique. Electrode™ enables the system to build a flexible and universal React/Node.js application, with support for server-side rendering and easy deployment. Use Electrode to start new projects quickly with a simple, consistent structure that follows modern best practices. The Electrode platform is managed by the Electrode Archetype System, which allows for a standardized configuration, structure and workflow throughout the entire application. By enforcing a sensible structure and consistency for components, modules and the entire app, Electrode's Archetype system helps you build scalable applications you can trust while ensuring streamlined development and deployment.

For example, Walmart.com™ at Scale: In the illustrated embodiment, 80 million monthly visitors, loads up to 10,000 requests per second, and 15 million items, adding more than one million new items each month is what Walmart.com's™ scale is all about. With a large e-commerce business, it is desired to scale Walmart.com™ and to leverage the talent and creativity of the engineering base.

Core Goals: In e-commerce development, platform migration is serious business. Technology evolves constantly and it's important to move and adapt to stay competitive. However, transforming an engineering organization is a completely different story. With over a few hundred engineers, and dozens of applications, a system including the Electrode™ platform was developed to solve core problems that every large scale organization faces including streamlined development cycles, structure and best practices, and software code reuse:

Streamlined Development Cycle—it is desired to have developers to on-board and start new projects quickly to realize the end goal of reduced time to market. When starting a new application, there are a lot of technologies and configurations that developers have to glue together (such as rendering on the server side, redux, webpack configs, css modules, post css, deployment scripts, internationalization, javascript/css linting, karma/mocha configs, code coverage configs, etc). To jump start new applications, it is desired to combine all of that in one easy to use package with a scalable structure that follows best practices. This way the Electrode™ system allows developers to focus their attention on building features that customers want.

Structure and Best Practices—With hundreds of engineers across dozens of teams, it is desired to ensure that all of the applications are consistent and reliable, and follow the most scalable development practices. It is also needed to focus results in consistent builds and deployments across projects, along with great scaffolding to start developers off on the right path. Electrode's™ predefined archetype system provides best practices and structures for building scalable applications that can be trust.

Code Reuse—Sharing React™ software components across projects and brands improves productivity—but only if developers can find the software components and trust their quality and consistency. Electrode's™ archetypes ensure consistent structure, and tools like Electrode Explorer™ make it easy to search through thousands of components to find what is needed.

Performance/Universal JavaScript—Server side rendering (SSR) makes a difference to performance and search engine optimization, so Electrode™ supports it out of the box. In addition, there is an opportunity to push the boundaries of performance even further, so Electrode™ was developed to include Caching and Profiling, Above the Fold Render, and Redux Router Engine.

One of the most frequently touted benefits of Facebook's React™ library is that its component model encourages code reuse. React™ is a JavaScript library for building user interfaces (UI). Declarative views make the code more predictable and easier to debug. React™ allows developers to build encapsulated software components that manage their own state, then compose those encapsulated software components to make complex UIs. Since component logic is written in JavaScript instead of templates, it can easily pass rich data through the application and keep state out of the DOM. A Simple Component, React™ components implement a render( ) method that takes input data and returns what to display.

Figure 5:
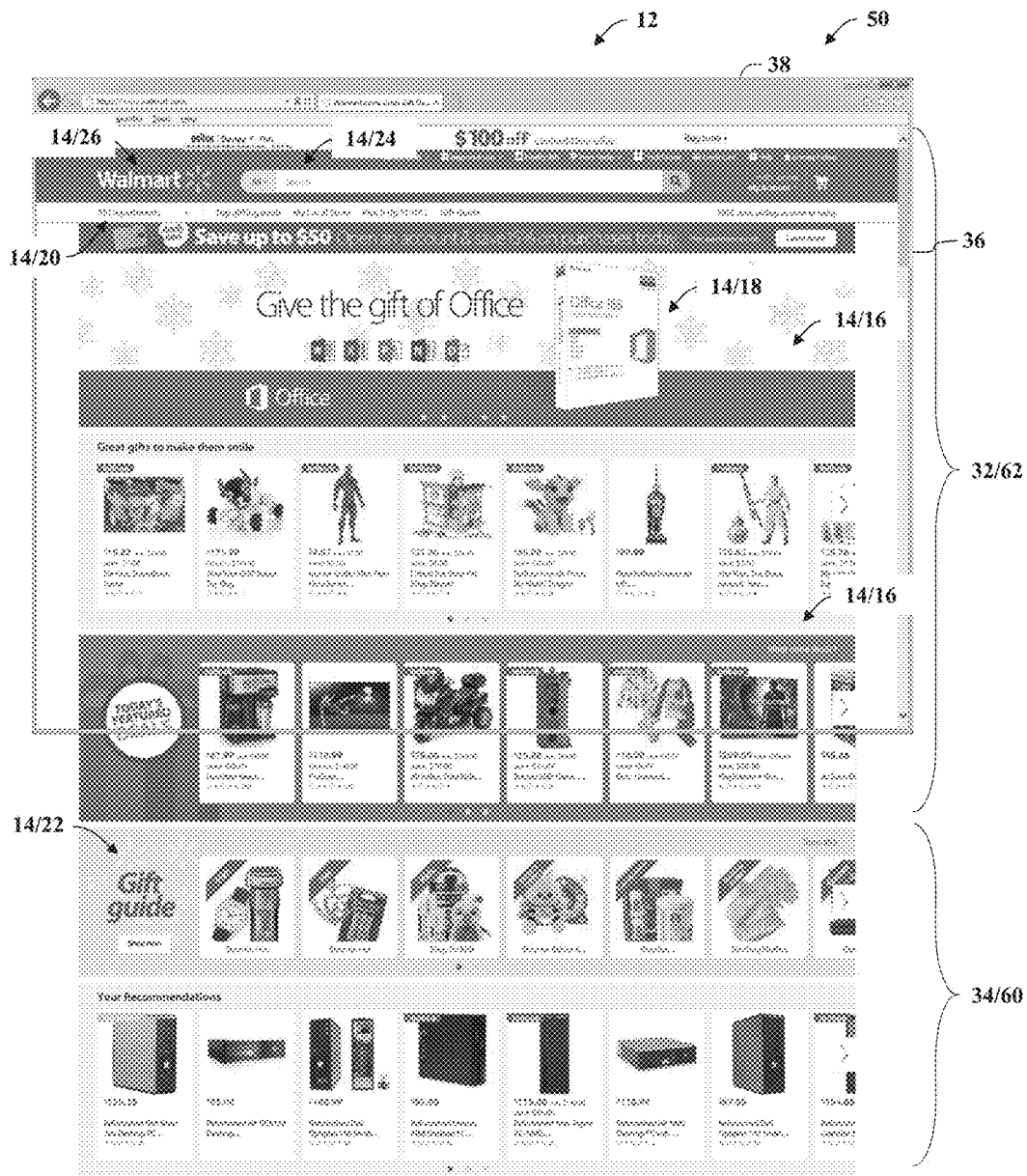
FIG. 5 is an illustration of an exemplary screenshot that may be generated by the system shown in FIGS. 1-2, according to embodiments of the present invention.
Figure 6:
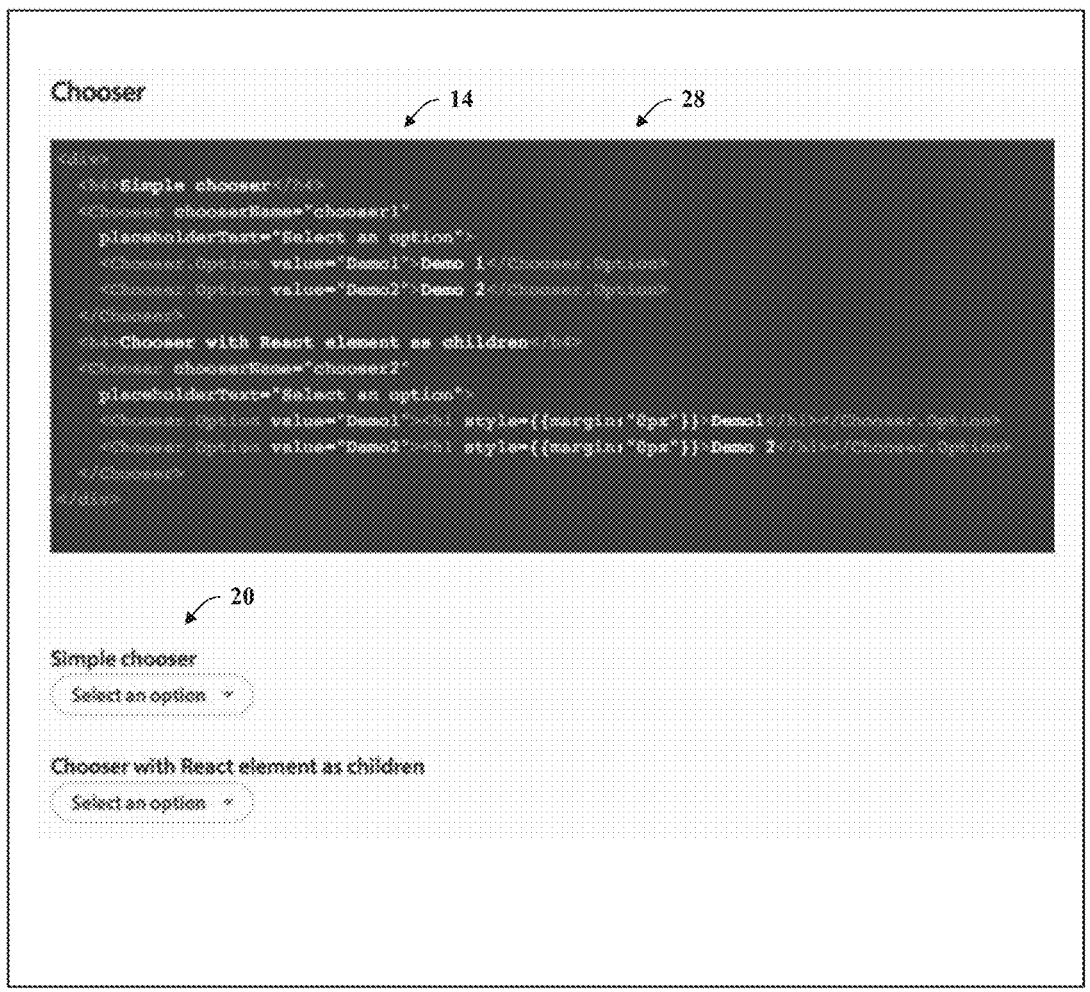

On a large scale, this means sharing software components across applications—for example, using a software component that generates a login box on a standalone login page and on a checkout page. With reference to FIG. 5, in one embodiment, for example, the system 10 may be configured to generate and display a webpage 12 that is composed of a plurality of software components 14 for use in generating webpage elements such as, for example, product carousels 16 displaying images of products 18, a chooser menu 20 that enables a user to select product categories to refine a product search, a product display 22 that displays product information in response to a product search request, a search field 24 that allows a user to input search terms for use by the system 10 to search and display relevant product information, a logo frame 26 that displays a brand logo image, etc. When implemented well, this code reuse can result in faster development time and fewer bugs. For example, FIG. 6 illustrates an example of the React™ component code 28 that may be used to generate the chooser menu 20 being displayed with the webpage 12 shown in FIG. 5.

In the illustrated embodiment, the system 10 is configured to execute the Electrode™ software program to improve react server side render performance by up to 70% over known computer rendering programs. The Electrode™ software program includes a react/node.js application platform that powers walmart.com with several goals in mind, including ease of use, re-usability of components across applications and, most importantly, performance. In one embodiment, server side rendering includes a process where the initial request loads the page, layout, CSS, JavaScript and content. For subsequent updates to the page, the client-side rendering approach repeats the steps it used to get the initial content. The Electrode™ software program enables server side rendering two reasons: 1) Improved performance for the customer; and 2) Better for Search Engine Optimization.

The system 10 includes an Above-the-Fold-Only-Server-Render™ software component 30 (shown in FIGS. 7, 8, and 10A-10C) that is a React™ component for optionally skipping server side rendering of software components outside above-the-fold (e.g. outside of the viewport). For example, images that appear above-the-fold. For example, as shown in FIG. 5, in one embodiment, the system 10 may be configured generate and display the webpage 12 including a plurality of first display images 32 and a plurality of second display images 34. The plurality of first images 32 include those webpages elements that appear within an above-the-fold area 36 that appears when the webpage is initially displayed in a web-browser window 38 of a client device. The plurality of second images 34 include those webpage elements that may appear as the user scrolls through the webpage to view other areas of the webpage that are outside of the above-the-fold area 36 and not initially displayed by the web-browser program. The above-the-fold-only-server-render software component 30 enables the system to render software components on the server that are within the above-the-fold area 36 and the remaining components on the client device.

The above-the-fold-only-server-render software component 30 is a standalone module and is agnostic of the web-server framework. The above-the-fold-only-server-render software component may be used in Electrode™, Express.js and Hapi.js applications.

In one embodiment, FIG. 7 illustrates the programming code 40 that may be used to implement the above-the-fold-only-server-render software component 30. For example, the above-the-fold-only-server-render software component 30 may be used as a wrapper to associated one or more software components with the above-the-fold-only-server-render software component 30. After wrapping one or more react components in the above-the-fold-only-server-render program wrapper, the system skips server side rendering on those software components associated with the above-the-fold-only-server-render software component and save on CPU render time by passing a skip={true} prop to the wrapper component.

FIG. 8 illustrates another version of the programming code 42 that may be used to implement the above-the-fold-only-server-render software component 30. As shown in FIG. 8, the above-the-fold-only-server-render software component 30 may be configured with abovethefoldonlyserverrender command an app context and pass the above-the-fold-only-server-render program wrapper a contextKey prop.

FIGS. 10A-10C illustrates another version of the programming code 43 that may be used to implement the above-the-fold-only-server-render software component 30. As shown in FIG. 10A, the above-the-fold-only-server-render software component 30 may be configured as a module that patches React's instantiateReactComponent function to allow a configurable set of component selectors to have their render( ) method skipped until they're mounted by the client. This way, SSR performance can be tuned by skipping certain components, without those components needing any changes.

Components that are skipped are wrapped in a component that doesn't render its children until componentDidMount. So a component that matches one of the selectors will be replaced with:
<AboveTheFoldRender>
<YourComponent foo="bar"/>
</AboveTheFoldRender>

In one embodiment, as shown in FIG. 10A, the above-the-fold-only-server-render software component 30 may include the instructions in the programming code 43. Since above-the-fold-render patches React, it must be imported before react gets imported elsewhere. Therefore, the system may setup and execute the code illustrated in FIG. 10B. To read options from an Electrode configuration, the system may execute the code shown in FIG. 10C. Supported Selectors: 1) foo bar: Descendant selector; 2) foo>bar: Direct ownership selector. Unlike CSS, foo must a direct owner of bar, not necessarily its immediate parent.

Referring to FIG. 1, in the illustrated embodiment, the system 10 includes a website hosting server 44, a software component database server 46, a software component database 48, and one or more client computing devices 50 that are each coupled in communication via a communications network 52. The communications network 52 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed. Each server may include one or more server computers that each include a processing device that includes a processor that is coupled to a memory device. The processing device executes various programs, and thereby controls components of the server according to user instructions received from the client computing devices and/or other servers. The processing device may include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device may also include a memory device for storing programs and information in one or more databases, and retrieving information from the databases that is used by the processor to perform various functions described herein. The memory device may include, but is not limited to, a hard disc drive, an optical disc drive, and/or a flash memory drive. Further, the memory device may be distributed and located at multiple locations.

The client computing device 50 may include any suitable device that includes a display device configured to display websites to the user and a user input device, such as, for example, a keyboard and/or mouse, that enables a user to access and communicate with the system 10 including sending and/or receiving information to and from the system 10 and displaying information received from the system 10 to a user. The client computing device 50 may include a processing device that includes a processor that is coupled to a memory device. The processing device executes various programs, and thereby controls components of the client computing device 50 according to user instructions received via the user input device and/or server computers. For example, in one embodiment, the client computing device 50 may include, but is not limited to, a desktop computer, a laptop or notebook computer, a tablet computer, smartphone/tablet computer hybrid, a personal data assistant, a handheld mobile device including a cellular telephone, and the like. In addition, the client computing device 50 may include a touchscreen that operates as the display device and the user input device. In the illustrated embodiment, the client computing device 50 includes a web-browser program that is stored in the memory device. When executed by the processor of the client computing device, the web-browser program enables the client computing device to receive software code from the website hosting server 44 including, but not limited to HTML, JavaScript, cascade style sheets (CSS), and any suitable programming code that enables the client computing device 50 to generate and display a website and/or webpages on the display device of the client computing device. The web-browser program also enables the client computing device 50 to receive instructions from the website hosting server 44 that enable the client computing device 50 to render HTML code for use in generating and displaying portions of the website and/or webpage.

The software component database server 46 includes a memory device that is connected to the software component database 48 to retrieve and store information contained in the software component database 48. The software component database 48 contains information on a variety of matters, such as, for example, information associated with webpages associated with one or more websites, software components, demonstration files, source code, integration code, object data, product images, product information, and/or any suitable information that enables the system 10 to function as described herein. The data and/or records contained in the software component database 48 may include searchable data terms including characters, symbols, letters, numbers, words, phrases, images, text data files, video data files, image data files, audio data files, and the like.

Figure 9:
FIG. 9 is an illustration of an exemplary database record generated by the system shown in FIGS. 1-2, according to embodiments of the present invention.

For example, in one embodiment, the software component database 48 may contain a plurality of data repositories 54 (shown in FIG. 9). Each data repository 54 includes one or more software component data files 56 associated with software components. Each software component data file 56 includes information associated with the corresponding software component including, but not limited to, software code (shown in FIGS. 6-8), source code, integration code, object data associated with a corresponding software component, and/or a unique component identifier 58 (shown in FIG. 9) such as, for example, a name, title, symbol, and/or any suitable unique identifier.

The website hosting server 44 is programmed to host a website including webpages 12 (shown in FIG. 5) that is accessible by a user via one or more client computing devices 50. The website hosting server 44 executes a website application program that retrieves software component data files 56 being stored in the software component database 48 and uses the software components to render one or more webpages on a display device of a client computing device 50 in response to requests received from the user via the client computing device 50 to allow users to interact with the website and search and/or purchase products such as, for example, goods and/or services via the website. In one embodiment, the website hosting server 44 is configured to generate and display web pages associated with the website in response to requests being received from consumers via corresponding web browsers that are displayed on the client computing devices 50. For example, in one embodiment, the website hosting server 44 may host an e-commerce website and display a product search webpage 12 (shown in FIG. 5) in response to receiving a user request that allows a user to input a product search request including search criteria including one or more search terms and retrieve and display product information associated with one or more products 18 in response to the user's search request. The website hosting server 44 may also allow the user to select one or more of the displayed products for purchase.

In the illustrated embodiment, each software component 14 includes instructions for generating HTML code string that may be used to generate and display a website and/or webpage. For example, in one embodiment, upon receiving a request to display a webpage from a client computing device 50, the website hosting server 44 may access the software component database 48, search one or more data repositories 54 and access the software component data files 56 to retrieve the software components 14 associated with the requested webpage. The website hosting server 44 may then execute a render-to-string operation to generate rendered code, such as, for example HTML code, using the instructions included with each software component 14, and transmit the rendered code to the client computing device 50. The web-browser program installed on the client computing device 50 executes the rendered code to generate and display webpage on the client computing device, including the webpage images and/or elements associated with software components 14.

In the illustrated embodiment, the software component data files 56 includes client software components 60 and server software components 62. Server software components 62 include software components 14 that are rendered by the web site hosting server 44. For example, when executing a render-to-string operation to generate HTML code, the website hosting server 44 executes the instructions included in the server software components 62 to generate rendered HTML code that is transmitted to the client computing device 50 for use in generating the corresponding webpage. Client software components 60 include software components 14 that are rendered using the web-browser program installed on the client computing device 50. The client software components 60 include instructions for rendering the corresponding client software component 60 on the client computing device 50. In the illustrated embodiment, the client software components 60 include the above-the-fold-only-server-render software component 30 included with the software code of the corresponding client software component 60. The above-the-fold-only-server-render software component 30 includes instructions that cause the website hosting server 44 to return code associated with the corresponding software component 14 when executing the above-the-fold-only-server-render software component 30.

For example, in one embodiment, the server software components 62 are associated with the plurality of first images 32 including those webpages elements that appear within an above-the-fold area 36 that appears when the webpage is initially displayed in a web-browser window 38 of a client device. The server software components 62 include software components 14 that are rendered by the website hosting server 44 to generate HTML code string to enable a fast webpage deployment on the client computing device 50. The client software component 60 are associated with the plurality of second images 34 including those webpage elements that may appear as the user scrolls through the webpage to view other areas of the webpage that are outside of the above-the-fold area 36 and not initially displayed by the web-browser program. The client software components 60 includes the above-the-fold-only-server-render software component 30 to cause the website hosting server 44 to return the corresponding software component code 28, and transmit the code 28 to the client computing device 50.

For example, as shown in FIG. 7, the above-the-fold-only-server-render software component 30 may be configured with abovethefoldonlyserverrender command in an app context and pass the above-the-fold-only-server-render program wrapper a contextKey prop. The contextKey prop may be used to identify the client software component 60 that is associated with the above-the-fold-only-server-render software component 30. When executed by the processor of the website hosting server 44, the above-the-fold-only-server-render software component 30 causes the processor to generate the component code, for example the component code 28 shown in FIG. 6, which may be used to generate rendered HTML code by the web-browser program of the client computing device 50.

In another embodiment, the above-the-fold-only-server-render software component 30 may be associated with one or more software components 14 and cause the processor to return component code associated with the software components 14 identified by the above-the-fold-only-server-render software component 30. For example, as shown in FIG. 8 the above-the-fold-only-server-render software component 30 may be used as a wrapper to associated one or more software components with the above-the-fold-only-server-render software component 30. After wrapping one or more software components 14 within the above-the-fold software component code, the above-the-fold-only-server-render software component 30 causes the processor to generate the component code 28 for each of the software components 14 identified in the above-the-fold software component code, which may be used to generate rendered HTML code by the web-browser program of the client computing device 50.

Figure 2:
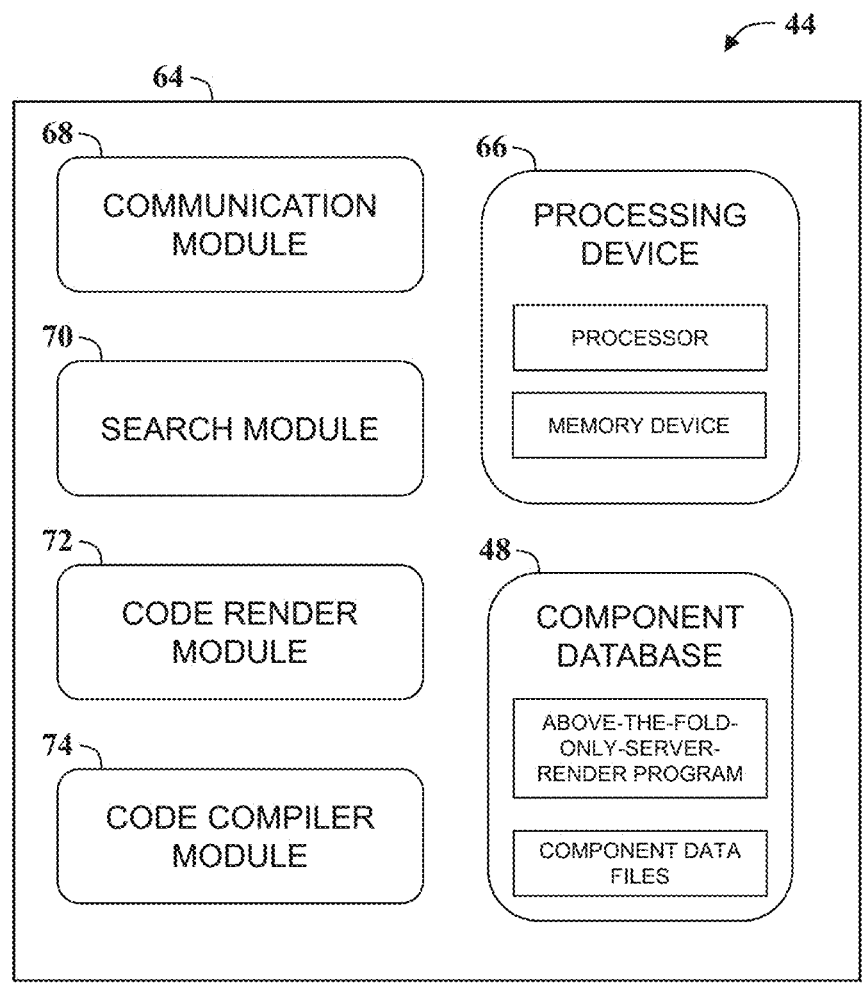
FIG. 2 is a schematic illustrating example components of a server computer that may be used with the system shown in FIG. 1, according to an embodiment of the present invention.

Referring to FIG. 2, in the illustrated embodiment, the website hosting server 44 includes a server computer 64 that includes a processing device 66 that is coupled to the component database 48, a communication module 68, a search module 70, a code render module 72, and a code compiler module 74. The processing device 66 includes one or more processors that are coupled to a memory device. In addition, the processing device 66 executes various programs, and thereby controls components of the server computer 64 according to user instructions received from the client computing devices 50 to enable users to interact with an operate the server computer 64. For example, in the illustrated embodiment, the processor is programmed to retrieve a software components 14 being stored within the component database 48 and execute the instructions included with the software components 14 to cause the processor to generate rendered code and/or component code that may be transmitting to the client computing device 50 for use in generating and displaying a website and/or webpage on the client computing devices 50 using the web browser programmed installed on the client computing devices 50.

The communication module 68 retrieves various data and information from the component database 48 that may be used by the website hosting server 44 in generating information that is associated with the software components 14 and sends information to the client computing device 50 via the communications network 52 to cause the client computing device 50 to display a website on the client computing device 50 to enable the user to access and interact with the system 10 via the website.

The search module 70 is programmed to transmit a request to the database server 46 to access each data repository 54 being stored in the software component database 48 and retrieve software component data files 56 including software components 14 associated with a requested webpage, and transmit the retrieved software components 14 to the code render module 72. For example, in one embodiment, the search module 70 may receive a request from a client computing device 50 such as, for example, a Uniform Resource Locator (url) associated with a webpage being transmitted from a web browser program being executed by the client computing device 50, and access the component database 48 to retrieve the software component 14 associated with the requested webpage 12. The search module 70 may then transmit the retrieved software components 14 to the code render module 72.

The code render module 72 is programmed to execute a render-to-string operation to generate code that may be transmitted to the client computing device 50 for use by the web-browser program to display a website and/or webpage on the client computing device 50. For example, in one embodiment, upon receiving a request to display a webpage from the client computing device 50, the code render module 72 may retrieve the software component 14 associated with the requested webpage from the component database 48 and/or receive the corresponding software components 14 from the search module 70. Each of the software components 14 include instructions for generating rendered code that may be used by the web-browser of the client computing device 50 to display the webpage 12.

In the illustrated embodiment, the retrieved software components 14 include one or more client software components 60 and one or more server software components 62. The server software component 62 includes instructions for rendering HTML code string for use in displaying webpage elements and/or images associated with the server software component 62. For example, when the code render module 72 executes a render-to-string operation, the instructions included in the server software component 62 causes the code render module 72 to generate the corresponding HTML code string. The client software component 60 includes the above-the-fold-only-server-render software component 30 which causes the code render module 72 to generate and return component code associated with the child component, e.g. the software component 60 associated with the above-the-fold-only-server-render software component 30, when executing a render-to-string operation. The component code of the child software component 60 includes instructions for generating HTML code that may be used by the client computing device 50 to display the webpage.

In the illustrated embodiment, the code render module 72 is configured to execute a render-to-string operation including accessing the component database 48 and retrieving a plurality of software components 14 associated with the webpage 12. Each of the software components 14 includes computer-executable instruction code for generating rendered code for use in displaying the webpage on the client computing device 50. In one embodiment, the plurality of software components 14 may include server software components 62 to be rendered by the code render module 72 and client software components 60 to be rendered by the client computing device 50.

The code render module 72 identifies the client software components associated with the webpage and generates component code including instructions for rendering the client software components on the client computing device 50. The code render module 72 also identifies the server software components associated with the webpage and generates rendered code associated with each server software component for use in displaying images associated with the webpage 12. In the illustrated embodiment, the code render module 72 transmits the rendered code and the component code to the code compiler module 74. The code compiler module 74 is configured to receive the rendered code and the component code from the code render module 72 and generate compiled code, and transmit the compiled code, including the rendered code and the component code to the client computing device 50.

In one embodiment, the code render module 72 may execute the server software components 62 to generate the rendered code including HTML code string. In addition, the code render module 72 may execute the client software component 60 to generate the component code in JavaScript including Cascade Style Sheets and/or instructions to generate rendered code including an HTML string. In one embodiment, the server software components 62 are associated with the first display images 32 of the webpage 12 and the wherein the client software components 60 are associated with the second display images 34 of the webpage 12. For example, when executed by the web-browser program installed on the client computing device 50, the compiled code cause the processor to generate and display the webpage using the received HTML string associated with the first display images 32 (e.g. images displayed above the fold), and execute the received JavaScript to render HTML code string associated with the second display images 34.

Figure 3:
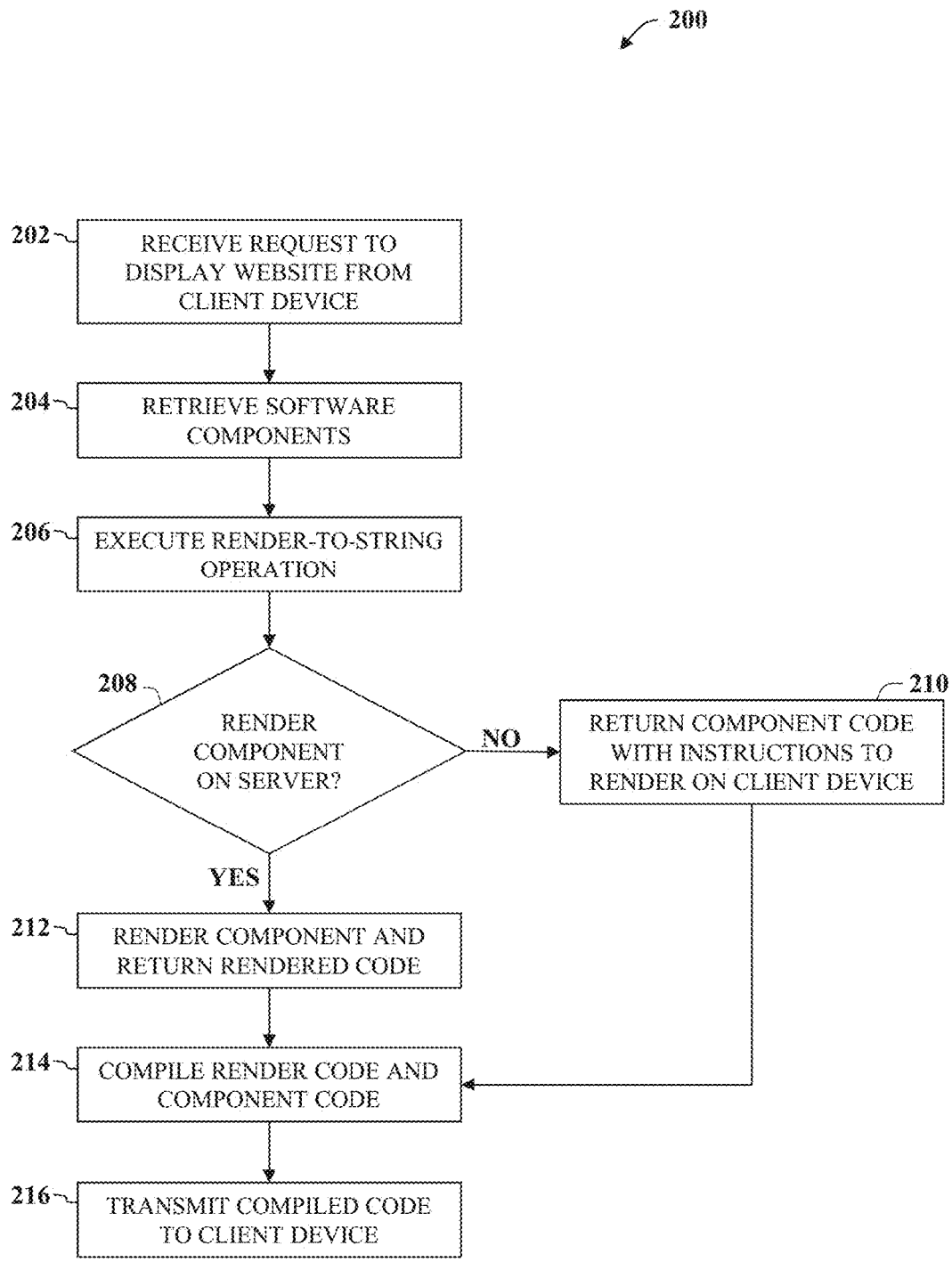
FIG. 3 is a flowchart of a method that may be used with the system shown in FIGS. 1-2, according to an embodiment of the present invention.
Figure 4:
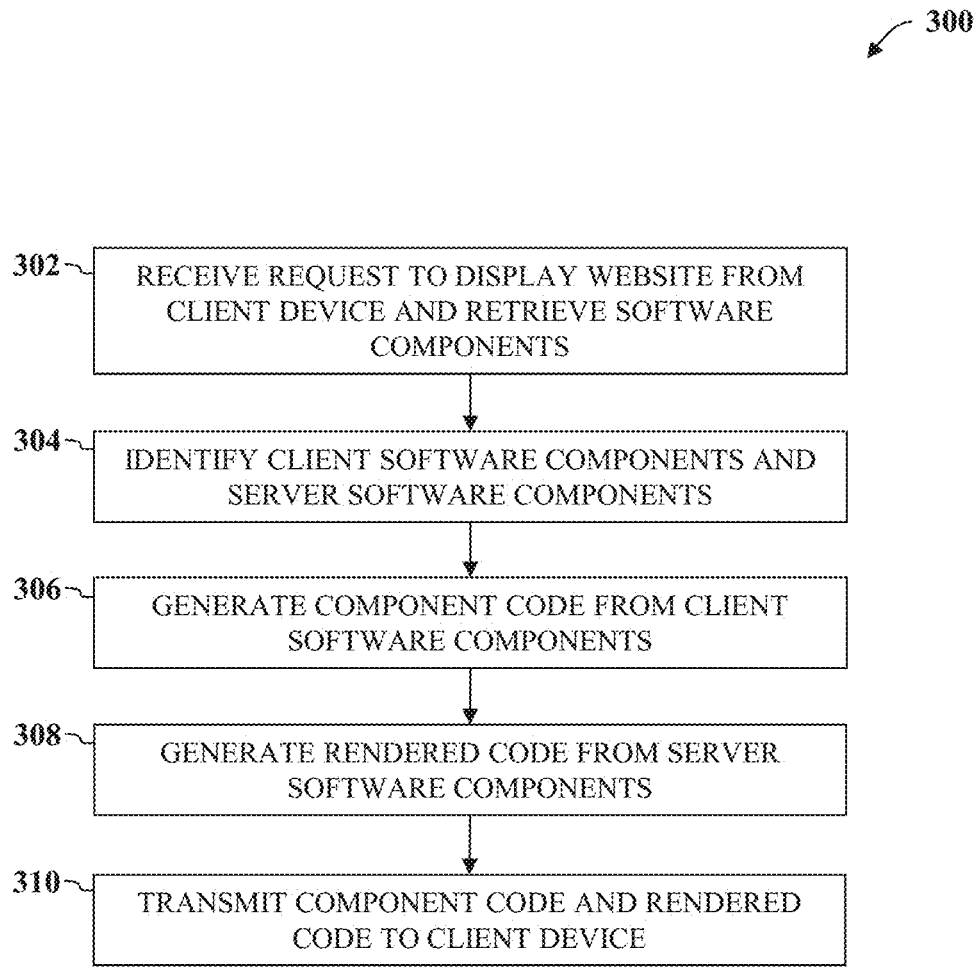
FIG. 4 is a flowchart of another method that may be used with the system shown in FIGS. 1-2, according to an embodiment of the present invention.

FIGS. 3 and 4 are flowcharts of methods 200 and 300 that may be used to operate the system 10 to display a webpage on a client computing device. The method includes a plurality of steps. Each method step may be performed independently of, or in combination with, other method steps. Portions of the methods may be performed by any one of, or any combination of, the components of the system 10. FIGS. 5-9 are exemplary graphical displays that may be displayed by the system 10.

Referring to FIG. 3, in the illustrated embodiment, in method step 202, the server computer 64 receives a request from a client computing device 50 to display a webpage 12. For example, in one embodiment, the server computer 64 may receive a url request associated with the webpage 12 from the client computing device 50.

In method step 204, in response to receiving the request, the server computer 64 accesses the component database 48 and retrieves the software components 14 that may be used to generate webpage 12.

In method step 206, the server computer 64 executes a render-to-string operation to generate HTML string code that may be transmitted by the server computer 64 to the client computing device 50 for use by the client web-browser program for displaying the webpage 12 on the client computing device 50.

In method step 208, the server computer 64 retrieve each software component 14 and determines if the retrieved software component 14 will be rendered by the server computer 64. More specifically, the server computer 64 determines if the software component 14 includes the above-the-fold-only-server-render software component 30, which causes the server computer 64 to return the code of the associated child software component.

In method step 210, upon determining that the retrieved software component 14 includes the above-the-fold-only-server-render software component 30 and will not be rendered by the server computer 64, the server computer 64 executes the above-the-fold-only-server-render software component 30 and generates component code that includes the code associated with the retrieved software component 14. The component code includes instructions that cause the client computing device 50 to renderer the HTML code string associated with the corresponding software component 14.

In method step 212, upon determining that the retrieved software component 14 does not include the above-the-fold-only-server-render software component 30, the server computer 64 renders the retrieved software component 14 and generates rendered code from the instructions included in the retrieved software component 14 including an HTML code string associated with the retrieved software component.

In method step 214, the server computer 64 compiles the component code and the rendered code. In method step 216, the server computer 64 transmits the compiled code to the client computing device 50. The compiled code causes the web-browser program installed on the client computing device 50 to generate and display the webpage 12 using the received HTML string associated with the first display images 32 (e.g. images displayed above the fold), and execute the received JavaScript to render HTML code string associated with the second display images 34.

Referring to FIG. 4, in one embodiment, in method step 302, the server computer 64 receives a request from a client computing device 50 to display the webpage 12 and executes a render-to-string operation including accessing the component database 48 and retrieving a plurality of software components 14 associated with the webpage 12. Each software component 14 includes computer-executable instruction code for generating rendered code for use in displaying the webpage on the client computing device 50. The plurality of software components 14 includes server software components 62 to be rendered by the server computer and client software components 60 to be rendered by the client computing device 50.

In method step 304, the server computer 64 identifies the client software components 60 that includes the above-the-fold-only-server-render software component 30 including instructions for generating component code, and identifies the server software component 62 including instructions for generated rendered code.

In method step 306, the server computer 64 executes the client software components 60 including the instructions included in the above-the-fold-only-server-render software component 30 and generates the component code associated with each client software component. In one embodiment, the component code includes code written in JavaScript including instructions for rendering an HTML string associated with the client software component by the client software components on the client computing device. In one embodiment, the above-the-fold-only-server-render software component 30 includes code 40 illustrated in FIG. 7. In another embodiment, the above-the-fold-only-server-render software component 30 may include code 42 and/or code 43 illustrated in FIGS. 8 and 10A-10C.

In method step 308, the server computer 64 executes the server software component 62 and generates rendered code associated with each server software component including an HTML string that includes instructions for use in displaying images associated with the webpage.

In method step 310, the server computer 64 compiles the rendered code and the component code and transmits the compiled code to the client computing device 50 for use in generating and displaying the webpage 12.

INDUSTRIAL APPLICABILITY

In general, the system 10 is configured to execute the Electrode™ software program that is a platform for building universal React/Node.js applications with a standardized structure that follows best practices. The Electrode™ software platform is the react/node.js application platform that powers walmart.com with several goals in mind, including ease of use, re-usability of components across applications and, most importantly, performance. For example, when executing Electrode™ software platform, the system 10 may improve react server side render performance by up to 70% over known application methods.

Server side rendering may be used for two reasons: 1) improved performance for the customer; and 2) better for SEO. For example, in tests, however, it was found that the system executing React's™ renderToString( ) command takes quite a while to execute—and since renderToString( ) is synchronous, the server is blocked while it runs. Every server side render executes renderToString( ) to build the HTML that the application server will be sending to the browser.

To solve this problem, the system 10 implements two Electrode software modules: 1) Above the Fold Render (ATF) and 2) Server Side Render Profiling and Caching (SSR Caching). For example, a test was conducted using the Walmart.com homepage application as a use case, which includes 10 image carousels.

Baseline: As a baseline test, the system was first configured with the application with no ATF module, no SSR Caching module, and with renderWithIds:true, and was ran it 30 times synchronously. The average renderToString( )call with this configuration took 153.80 ms.

Electrode Default—renderWithIds:False: By default, though, the Electrode™ application includes renderWithIds: false, which gives us a renderToString( ) time of 124.80 ms, which improves render time by 19%.

Server Side Render Profile and Caching: SSR Caching of the header, footer, and carousels, was implemented which enabled an average renderToString( ) of 96.80 ms. A 23% improvement from the Electrode default.

Above The Fold Render: By implementing ATF Rendering-only render, the renderToString( ) time was improved to 65.73 ms, a 48% reduction. Meaning a lot of those image carousels were below the fold.

SSR Caching+ATF Render: Finally, the system 10 was configured to use SSR Caching and ATF rendering together. That drops the renderToString( ) time all the way to 36.56 ms, a 71% improvement from the default Electrode configuration, and a 76% improvement from the original, unoptimized test. This is synchronous code, which means it stops the Node.js application from doing anything else until it's finished. With ATF Rendering, the system 10 operates at an almost 30% improvement because the system 10 is only rendering webpage content above the fold, then immediately kicking off React rendering on the client side.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. One or more non-transitory computer-readable storage media, storing computer-executable instructions configured, when executed by at least one or more processors, to cause the one or more processors to:

receive, using a website server computer, a request to display a webpage on a client computing device; and execute, by the website server computer, a render-to-string operation to generate rendered code associated with a child software component upon receiving the request, including:

access a database and retrieve a plurality of software components associated with the webpage, each software component of the plurality of software components including computer-executable instruction code for generating the rendered code for use in displaying the webpage on the client computing device, the plurality of software components including website server software components to be rendered by the website server computer and client software components to be rendered by a web-browser program on the client computing device, wherein the child software component is associated with an above-the-fold-only-server-render software component;

identify the client software components associated with the webpage and generate component code including instructions for the child software component to generate HTML code rendering the above-the-fold-only-server-render software component by the web-browser program on the client computing device;

identify the child software component as part of the website server software components associated with the webpage and generate the rendered code associated with each website server software component of the website server software components for use in displaying images that appear in an above-thefold area of the webpage on the client computing device, wherein the above-the-fold area comprises a portion of the webpage initially displayed in a web-browser window of the client computing device;

compile, by the website server computer using a compiler device, the component code and the rendered code to generate compiled code; and transmit signals comprising the compiled code to the web-browser program on the client computing device to generate and display on the web-browser program at least webpage images associated with the plurality of software components of the webpage, wherein the images comprise the at least webpage images that appear in the above-the-fold area of the webpage.

2. The one or more non-transitory computer-readable storage media of claim 1, wherein the computer-executable instructions cause the one or more processors to generate the rendered code in HTML.

3. The one or more non-transitory computer-readable storage media of claim 1, wherein the computer-executable instructions cause the one or more processors to generate the component code in JavaScript including instructions to generate the rendered code in HTML.

4. The one or more non-transitory computer-readable storage media of claim 1, wherein the computer-executable instructions cause the one or more processors to generate the webpage including a plurality of first display images and a plurality of second display images, the plurality of first display images appear in the above-the-fold area of the webpage displayed on the client computing device before the plurality of second display images, wherein the plurality of second display images appear below the above-the-fold area of the webpage.

5. The one or more non-transitory computer-readable storage media of claim 4, wherein the website server software components are associated with the plurality of first display images that appear in the above-the-fold area of the webpage.

6. The one or more non-transitory computer-readable storage media of claim 4, wherein the client software components are associated with the plurality of second display images that appear below the above-the-fold area of the webpage.

7. The one or more non-transitory computer-readable storage media of claim 1, wherein at least one client software component of the client software components further comprises programing code to execute the above-the-fold-only-server-render software component and is written in JavaScript.

8. The one or more non-transitory computer-readable storage media of claim 7, wherein the above-the-fold-only-server-render software component is a React component that causes the one or more processors to generate the component code.

9. A computer-implemented method for operating a web site server computer system for use in displaying a webpage on a client computing device, including the web site server computer performing:

receiving, using the web site server computer, a request from the client computing device to display the webpage on the client computing device; and executing, by the website server computer, a render-to-string operation to generate rendered code associated with a child software component upon receiving the request, including:

accessing a database and retrieving a plurality of software components associated with the webpage, each software component of the plurality of software components including computer-executable instruction code for generating the rendered code for use in displaying the webpage on the client computing device, the plurality of software components including web site server software components to be rendered by the website server computer and client software components to be rendered by a web-browser program on the client computing device, wherein the child software component is associated with an above-the-fold-only-server-render software component;

identifying the client software components associated with the webpage and generating component code including instructions for the child software component to generate HTML code rendering the above-the-fold-only-server-render software component by the web-browser program on the client computing device;

identifying the website server software components associated with the webpage and generating the rendered code associated with each website server software component of the website server software components for use in displaying images associated with the webpage on the client computing device, wherein an above-the-fold area comprises a portion of the webpage initially displayed in a web-browser window of the client computing device;

compiling, by the website server computer using a compiler device, the component code and the rendered code to generate compiled code; and transmitting signals comprising the compiled code to the web-browser program on the client computing device to generate and display on the web-browser program at least webpage images associated with the plurality of software components of the webpage, wherein the images comprise the at least webpage images that appear in the above-the-fold area of the webpage.

10. The computer-implemented method of claim 9, including generating the rendered code in HTML.

11. The computer-implemented method of claim 9, including generating the component code in JavaScript including instructions to generate the rendered code in HTML.

12. The computer-implemented method of claim 9, including generating the webpage including a plurality of first display images appear in the above-the-fold area of the webpage and a plurality of second display images, the plurality of first display images displayed on the client computing device before the plurality of second display images, wherein the plurality of second display images appear below the above-the-fold area of the webpage.

13. The computer-implemented method of claim 12, wherein the website server software components are associated with the plurality of first display images that appear in the above-the-fold area of the webpage.

14. The computer-implemented method of claim 12, wherein the client software components are associated with the plurality of second display images that appear below the above-the-fold area of the webpage.

15. The computer-implemented method of claim 9, wherein at least one client software component of the client software components further comprises programing code to execute an above-the-fold-only-server-render software component and is written in JavaScript.

16. The computer-implemented method of claim 15, wherein the above-the-fold-only-server-render software component is a React component that causes the one or more processors to generate the component code.

17. A system for use in displaying a webpage, comprising:
a website server computer;
a client computing device in data communication with the website server computer, the client computing device including a display device, a memory device, and a processor coupled to the memory device, the memory device including a web-browser program being stored therein, the processor configured to execute the web-browser program to display the webpage on the display device; and
a database including a plurality of software components associated with the webpage, each software component including computer-executable instruction code for generating rendered code for use in displaying the webpage on the client computing device, the plurality of software components including website server software components to be rendered by the website server computer and client software components to be rendered by the web-browser program on the client computing device;
the website server computer configured to:
receive a request to display the webpage on the client computing device; and
execute a render-to-string operation to generate the rendered code associated with a child software component upon receiving the request, including:
access the database and retrieve the plurality of software components associated with the webpage, each software component of the plurality of software components including computer-executable instruction code for generating the rendered code for use in displaying the webpage on the client computing device, the plurality of software components including website server software components to be rendered by the website server computer and client software components to be rendered by the web-browser program on the client computing device, wherein the child software component is associated with an above-the-fold-only-server-render software component;
identify the client software components associated with the webpage and generate component code including instructions for the child software component to generate HTML code rendering the above-the-fold-only-server-render software component by the web-browser program on the client computing device;
identify the website server software components associated with the webpage and generate the rendered code associated with each website server software component of the website server software components for use in displaying images associated with the webpage on the client computing device, wherein an above-the-fold area comprises a portion of the webpage initially displayed in a web-browser window of the client computing device;
compile, by the website server computer using a compiler device, the component code and the rendered code to generate compiled code; and
transmit signals comprising the compiled code to the web-browser program on the client computing device to generate and display on the web-browser program at least webpage images associated with the plurality of software components of the webpage, wherein the images comprise the at least webpage images that appear in the above-the-fold area of the webpage.

18. The system of claim 17, wherein the website server computer is configured to generate the rendered code in HTML.

19. The system of claim 17, wherein the website server computer is configured to generate the component code in JavaScript including instructions to generate the rendered code in HTML.

20. The system of claim 17, wherein the webpage includes a plurality of first display images appear in the above-the-fold area of the webpage and a plurality of second display images appear below the above-the-fold area of the webpage, the plurality of first display images displayed on the client computing device before the plurality of second display images;
wherein the website server software components are associated with the plurality of first display images that appear in the above-the-fold area of the webpage; and
wherein the client software components are associated with the plurality of second display images that appear below the above-the-fold area of the webpage.

* * * * *